United States Patent
Xie (10) Patent No.: US 11,032,892 B2
(45) Date of Patent: Jun. 8, 2021

(54) LUMINANCE DETERMINING METHOD

(71) Applicant: XIAMEN ECO LIGHTING CO. LTD., Xiamen (CN)

(72) Inventor: Jianxin Xie, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/803,327

(22) Filed: Feb. 27, 2020

(65) Prior Publication Data
US 2020/0344865 A1    Oct. 29, 2020

(30) Foreign Application Priority Data
Apr. 24, 2019   (CN) .......................... 201910332649.6

(51) Int. Cl.
H05B 47/10    (2020.01)
H05B 47/115   (2020.01)
H05B 47/13    (2020.01)

(52) U.S. Cl.
CPC .................................. H05B 47/13 (2020.01)

(58) Field of Classification Search
CPC ...... H05B 47/10; H05B 47/105; H05B 47/13; H05B 33/08; H05B 37/02; H05B 47/115; H05B 47/125; H05B 47/195; Y02B 20/40
See application file for complete search history.

(56) References Cited

U.S. PATENT DOCUMENTS

| | | | | |
|---|---|---|---|---|
| 2012/0105630 A1* | 5/2012 | Cao | ................... | G08B 13/19608 348/143 |
| 2012/0310417 A1* | 12/2012 | Enohara | ................... | F24F 11/30 700/276 |
| 2012/0319596 A1* | 12/2012 | Nanahara | .............. | H05B 47/105 315/153 |
| 2012/0326611 A1* | 12/2012 | Nanahara | .............. | H05B 47/105 315/151 |
| 2013/0241418 A1* | 9/2013 | Kercso | ................. | H05B 47/105 315/152 |
| 2013/0241420 A1* | 9/2013 | Bal Zs | ................. | H05B 47/175 315/154 |
| 2015/0123545 A1* | 5/2015 | Fushimi | ............... | H05B 47/105 315/130 |
| 2015/0123547 A1* | 5/2015 | Fushimi | .................. | A47F 3/001 315/155 |

* cited by examiner

*Primary Examiner* — Thai Pham
(74) *Attorney, Agent, or Firm* — Chun-Ming Shih; Lanway IPR Services (57) ABSTRACT

In determining luminance, a location of human presence is referred. An infrared sensor detects the human presence in its proximity. The infrared sensor's effective detecting region includes a first region and a second region. The first region is farther from the infrared sensor than the second region is. And the first region surrounds the second region. Second, a first luminance is set for human presence within the first region; a second luminance is set for human presence within the second region; and a third luminance is set for nonoccurrence of human presence within both the first region and the second region. In addition, the second luminance is higher than the first illuminance, and the first illuminance is higher than the third illuminance. Third, an illuminating device is activated by applying the first luminance, the second luminance, or the third luminance, in response to a location of the detected human presence.

9 Claims, 6 Drawing Sheets

LUMINANCE DETERMINING METHOD

FIELD OF THE INVENTION

The present invention relates to a method of determining luminance, and more particularly, to a method of determining luminance according to a location of human presence.

BACKGROUND

As technology develops, illuminating devices are getting more intelligent. For example, an illuminating device can be controlled via a sensor's detection result.

Nowadays, an illuminating device may usually include sensors, such as a pyroelectric infrared (PIR) sensor or a microwave sensor. However, either the PIR sensor or the microwave sensor can only detect human presence of a moving human and fails to detect human presence of an immobile human. Therefore, such sensors' detection result cannot be used for controlling the illuminating device's luminance for immobile human.

SUMMARY OF THE INVENTION

The present invention aims at determining luminance according to a location of human presence.

According to one embodiment, the present invention discloses a method of determining luminance. In the disclosed method, first, human presence is detected in the proximity of an infrared sensor. Also, an effective detecting region of the infrared sensor includes a first region and a second region. And the first region is farther from the infrared sensor than the second region is. Last, the first region surrounds the second region. Second, a first luminance is set for human presence within the first region; a second luminance is set for human presence within the second region; and a third luminance is set for nonoccurrence of human presence within both the first region and the second region. In addition, the second luminance is higher than the first illuminance, and the first illuminance is higher than the third illuminance. Third, an illuminating device is activated by applying the first luminance, the second luminance, or the third luminance, in response to a result of detecting human presence within the effective detecting region of the infrared sensor.

In one example, the illuminating device is activated by applying the first luminance when the infrared sensor detects human presence within the first region.

In one example, the illuminating device is activated by applying the second luminance when the infrared sensor detects human presence within the second region.

In one example, the illuminating device is activated by applying the third luminance when the infrared sensor fails to detect human presence within either the first region or the second region.

In one example, illuminance of the illuminating device is switched from an original illuminance to the applied luminance. More particularly, in some examples, the illuminance of the illuminating device is switched from the original illuminance to the first luminance when the infrared sensor detects human presence within the first region. In some other examples, the illuminance of the illuminating device is switched from the original illuminance to the second luminance when the infrared sensor detects human presence within the second region. In addition, in some examples, the illuminance of the illuminating device is switched from the original illuminance to the third luminance when the infrared sensor fails to detect human presence within either the first region or the second region.

In one example, the illuminance of the illuminating device is gradually switched from the original illuminance to the applied luminance.

According to an embodiment, the present invention discloses a method of determining luminance. In the disclosed method, first, human presence is detected in the proximity of an infrared sensor. And an effective detecting region of the infrared sensor includes a first region and a second region. Also, the first region is farther from the infrared sensor than the second region is, and the first region surrounds the second region. Second, a lasting time interval is calculated when human presence is detected within the effective detecting region of the infrared sensor. Third, a first luminance is set for human presence within the first region; a second luminance is set for human presence within the second region; and a third luminance is set for nonoccurrence of human presence within both the first region and the second region. Moreover, the second luminance is higher than the first illuminance, and the first illuminance is higher than the third illuminance. Last, an illuminating device is activated using the first luminance, the second luminance, or the third luminance, in response to a result of detecting human presence within the effective detecting region of the infrared sensor and the lasting time interval of the detected human presence.

In one example, the illuminating device is activated by applying the first luminance when the infrared sensor detects human presence within the first region and when the lasting time interval of the detected human presence within the first region exceeds a predetermined time interval.

In one example, the illuminating device is activated by applying the second luminance when the infrared sensor detects human presence within the second region and when the lasting time interval of the detected human presence within the second region exceeds a predetermined time interval.

In one example, the illuminating device is activated by applying the third luminance when the infrared sensor fails to detect human presence within either the first region or the second region for at least a predetermined time interval.

In one example, illuminance of the illuminating device is switched from an original illuminance to the applied luminance when the lasting time interval of the detected human presence exceeds a predetermined waiting time interval.

In one example, illuminance of the illuminating device is switched from the original illuminance to the first luminance when the infrared sensor detects human presence within the first region and when the lasting time interval of the detected human presence within the first region exceeds a predetermined time interval.

In one example, illuminance of the illuminating device is switched from the original illuminance to the second luminance when the infrared sensor detects human presence within the second region and when the detected human presence within the second region exceeds a predetermined time interval.

In one example, illuminance of the illuminating device is switched from the original illuminance to the third luminance when the infrared sensor fails to detect human presence within either the first region or the second region for at least a predetermined time interval.

In one example, illuminance of the illuminating device is gradually switched from the original illuminance to the applied luminance when the lasting time interval of the detected human presence exceeds the predetermined waiting time interval.

In one embodiment, the present invention discloses an illuminating device that includes an infrared sensor, a memory, an illuminating component and a processing unit. The infrared sensor detects human presence within its effective detecting region. And the effective detecting region includes a first region and a second region.

Also, the first region is farther from the infrared sensor than the second region is, and the first region surrounds the second region. The memory stores luminance setting of the illuminating device. And the luminance setting includes a first luminance for human presence within the first region, a second luminance for human presence within the second region, and a third luminance for nonoccurrence of human presence within both the first region and the second region. In addition, the second luminance is higher than the first illuminance, and the first illuminance is higher than the third illuminance. The processing unit activates the illuminating component by applying the first luminance, the second luminance, or the third luminance, in response to a result of detecting human presence within the effective detecting region of the infrared sensor.

In one embodiment, the present invention discloses another illuminating device that includes an infrared sensor, a timer, a memory, an illuminating component and a processing unit. The infrared sensor detects human presence within its effective detecting region. And the effective detecting region includes a first region and a second region. Also, the first region is farther from the infrared sensor than the second region is, and the first region surrounds the second region. The timer calculates a lasting time interval when the infrared sensor detects human presence within the effective detecting region of the infrared sensor. The memory stores luminance setting of the illuminating device. And the luminance setting includes a first luminance for human presence within the first region, a second luminance for human presence within the second region, and a third luminance for nonoccurrence of human presence within both the first region and the second region. Moreover, the second luminance is higher than the first illuminance, and the first illuminance is higher than the third illuminance. The processing unit activates the illuminating component by applying the first luminance, the second luminance, or the third luminance, in response to a result of detecting human presence within the effective detecting region of the infrared sensor and a result of calculating the lasting time interval.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, the present invention discloses a method of determining lighting locations for providing luminance according to instant human presence.

Figure 1:
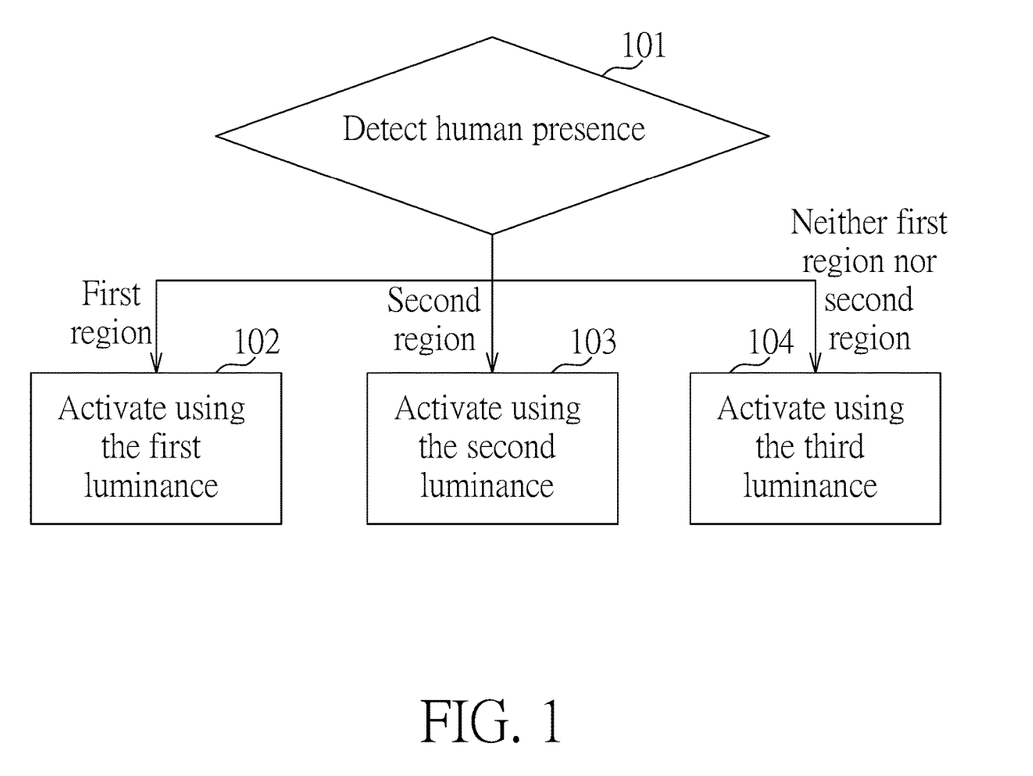
FIG. 1 illustrates a flowchart of a luminance determining method according to one embodiment.
Figure 6:
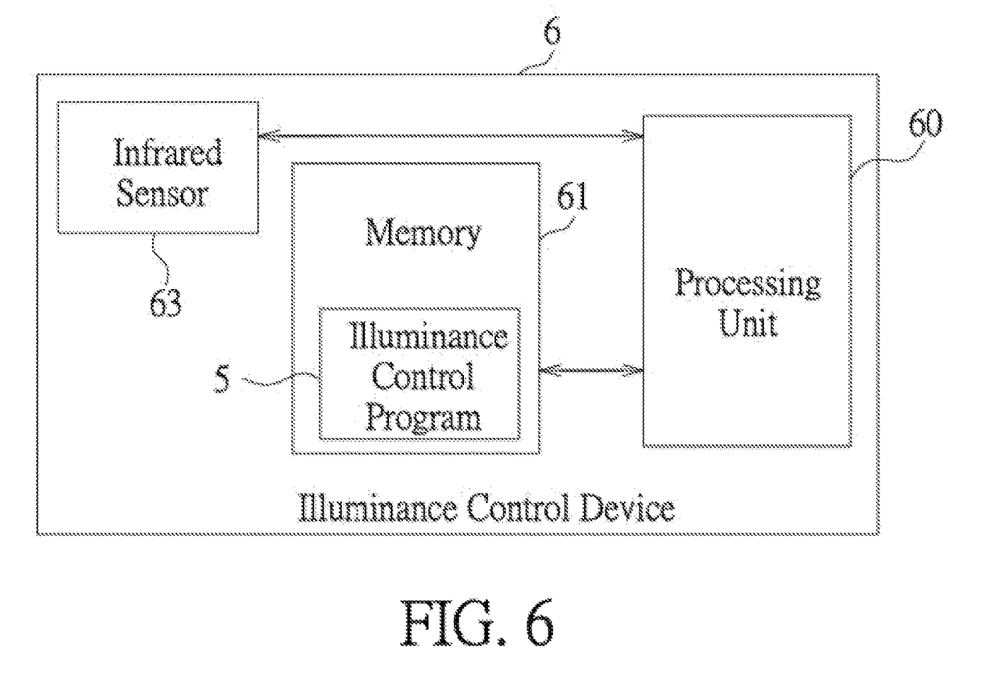
FIG. 6 illustrates an illuminance control device that is used for implementing the disclosed luminance determining method according to one embodiment.

FIG. 1 illustrates a flowchart of the disclosed method according to one embodiment. It is noted that the following steps can be implemented using an illuminance control device 6, as shown in FIG. 6. Also, the illuminance control device 6 includes a processing unit 60, a memory 61 and an infrared sensor 63. In some examples, the disclosed method is coded as an illuminance control program 5 that is stored in the memory 61. Such that the processing unit 60 implements the disclosed method by loading and executing the illuminance control program 5 via the memory 61.

In some examples, the processing unit 60 may be implemented using a central processing unit, a general-purpose processing unit, a digital signal processor, an application specific integrated circuit, a field-programmable gate array, a programmable logic unit, a diode logic component, a distributed hardware component, and/or a distributed switch component. The general-purpose processing unit may be a microprocessor or any types of regular processing unit.

The memory 61 may be an internal storage unit of the terminal device, such as a hard-drive or an internal memory. The memory 61 may also be an external storage unit of the terminal device, such as a plug-in hard-drive, a smart media card, a secure digital card, and/or a flash card. In some examples, the memory 61 may include both the internal storage unit and the external storage unit.

In Step 101, the processing unit 61 detects human presence in the proximity of the infrared sensor 63.

Figure 2:
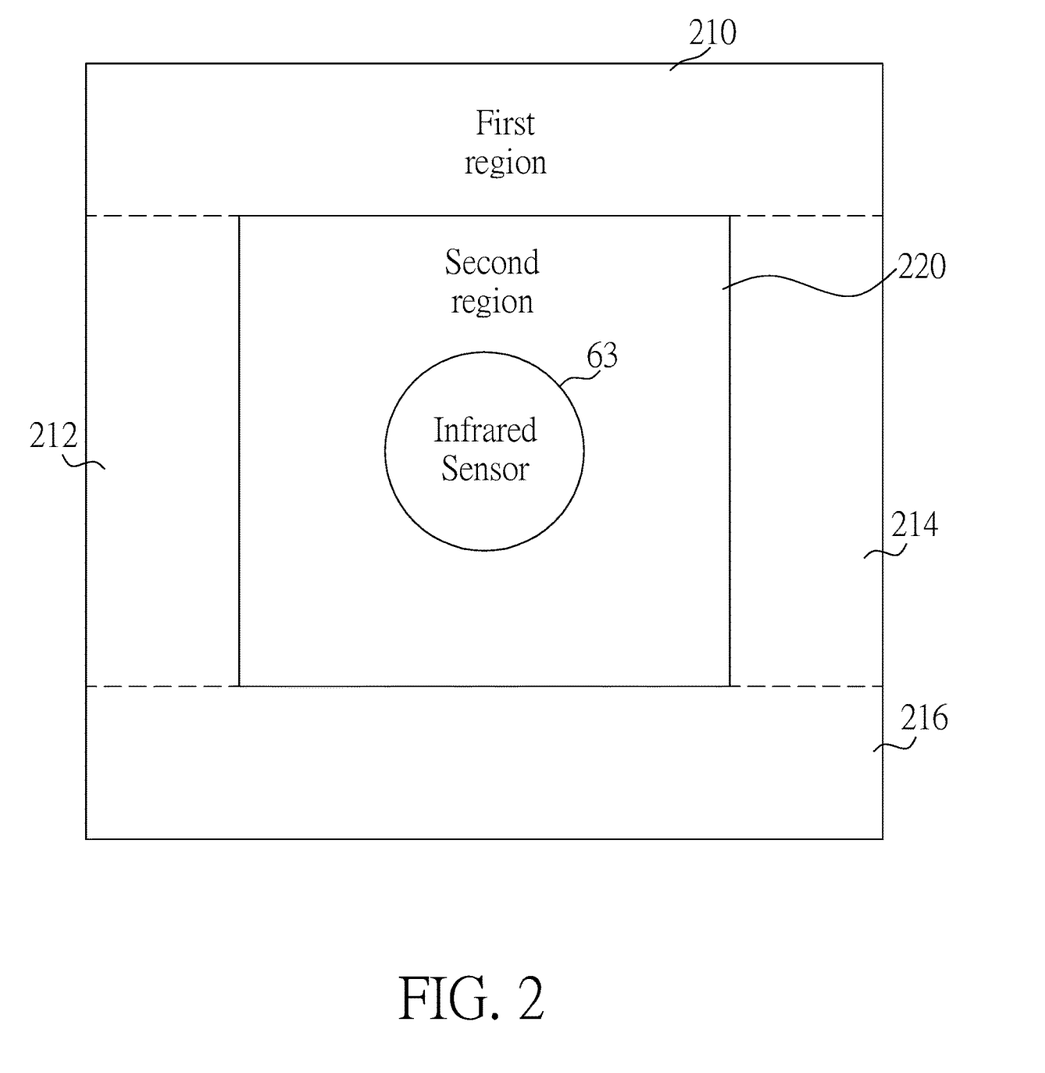
FIG. 2 illustrates a diagram of an infrared sensor's proximity that is segmented into at least a first region and a second region.

More specifically, the infrared sensor 63's proximity can be segmented into multiple regions according to a distance from the infrared sensor 63. FIG. 2 illustrates a diagram of the infrared sensor 63's proximity that is segmented into at least a first region 210 and a second region 220. The second region 220 centers at the infrared sensor 63's location and immediately surrounds the infrared sensor 63. Also, the first region 210 surrounds the second region 220. Such that the first region 210 is farther from the infrared sensor 63 than the second region 220 is. In this way, the first region 210's internal boundary meets the second region 220's external boundary.

In some examples, the infrared sensor 63's proximity refers to a two-dimensional matrix that has 40×40 dots. Assume that a left-top corner of the infrared sensor 63's proximity's coordinate is located at the coordinate (0,0) of the matrix, i.e., the origin of the matrix. The second region 220's left-top corner's coordinate may be (10,10). And the second region 220's right-bottom corner's coordinate may be (29,29). Also, the first region 210 can be segmented into four rectangular regions, each of which can be defined using respective corners' coordinates, e.g. both the left-top corner and the right-bottom corner's coordinates. In some other examples, the four rectangular regions may also be defined using, for example, both the left-bottom corner and the right-top corner's coordinates, all the four corners' coordinates, or both a center coordinate and a corresponding radius.

When human presence is detected in the first region 210, go to Step 102. When human presence is detected in the second region 220, go to Step 103. Else, when human presence is detected in none of the first region 210 and the second region 220, go to Step 104.

In some embodiments, the infrared sensor 63 is replaced using an infrared sensor array that includes multiple infrared sensors. In this way, the illuminating control device 6 expands its range of sensing human's movements.

Also, in some examples, the infrared sensor 63 may cooperate with an arithmetic central processing unit (CPU) and a communicating CPU. The infrared sensor 63 is connected to the arithmetic CPU via a collector pin. In addition, the arithmetic CPU is connected to the communicating CPU via a control pin. Such that the illuminating control device 6 may include the communicating CPU, a control CPU, a driver unit, and an illuminating unit. The communicating CPU and the control CPU can be connected and communicate with each other via the control pin. And the control CPU controls related luminance parameters for driving the illuminating unit. In this way, the abovementioned infrared sensor array communicates with the communicating CPU of multiple illuminating control devices 6, in a wired manner or a wireless manner. Such wireless means include ZigBee, BLE, and BLE mesh. Exemplary wired means includes 485, 232 and Ethernet communications.

For brevity, the term "luminance" mentioned throughout this specification may include luminance, illuminating frequency, brightness, and/or color deepness.

The infrared sensor array's arithmetic operations and communications can be processed in a same CPU or among two different CPUs. The illuminating control device 6 can be driven via a pulse-width modulation control by the communicating CPU. Such that the illuminating control device 6's luminance is controlled accordingly.

In some examples, the infrared sensor 63 can be disposed within or external to the illuminating control device 6. Also, the infrared sensor 63 is capable of transmitting information including, for example, a sensed human's location or coordinate. In some examples, the infrared sensor 63 completes such transmission in real-time.

The terminal device receives the transmitted information from the infrared sensor 63 and determines human presence within the infrared sensor 63's detection range. As mentioned above, the infrared sensor 63's detection range includes the first region and a second region 220. Note that the first region includes sub-regions 210, 212, 214 and 216. In addition, the terminal device stores locations of the first region and the second region 220 in advance. Such that the detected human presence's coordinate can be determined using the pre-stored locations of the first region and the second region 220.

In Step 102, when the infrared sensor 63 detects human presence within the first region and detects no human presence within the second region 220, the processing unit 60 initiates the illuminance control program 5 to control the illuminating control device 6's luminance to a first luminance, which is predetermined and pre-stored in the memory 61.

In some embodiments, different regions refer to different types of luminance that are pre-stored in the memory 61. For example, when someone stays within the first region and no one stays within the second region 220, the processing unit 60 controls the illuminating control device 6's luminance to the first luminance that corresponds to the first region. In some examples, the first luminance represents luminance required for most people who stays within the first region, for example, for his/her best vision without causing any discomfort to his/her eyes.

In some examples, the processing unit 60 gradually switches to the first luminance within a predetermined time interval, such as one or two seconds.

In some examples, the utilized illuminating unit that is controlled by the illuminating control device 6 is a multi-color-temperature lamp. Such that the processing unit 60 may controls the multi-color-temperature lamp's parameters that include utilized luminance, used color temperature, and/or an activated color.

When it comes to luminance, the first region and the second region 220 refer to different predetermined luminance. If the infrared sensor 63 detects human presence in only the first region, the processing unit 60 adjusts the illuminating control device 6's luminance to the first luminance that corresponds to the first region. In some examples, the first luminance is 10% that best fits a human's vision.

In Step 103, when the infrared sensor 63 detects human presence in the second region 220, the processing unit 60 adjusts the illuminating control device 6's luminance to the second luminance. Also, the second luminance is higher than the first luminance.

In some examples, when the infrared sensor 63 detects human presence in the second region 220, no matter if there is human presence within the first region, the processing unit 60 adjusts the illuminating control device 6's luminance to the second luminance that best fits a human's vision without causing discomfort to human eyes. In some examples, the first luminance is preset to be 10%, and the second luminance is preset to be 100%. That is, when human presence is closer to the infrared sensor 63, the processing unit 60 applies higher luminance for the illuminating control device 6.

In Step 104, when the infrared sensor 63 fails to detect human presence within the first region or the second region 220, the processing unit 60 adjusts the illuminating control device 6's luminance to a third luminance that is smaller than the first luminance. In addition, the third luminance best fits human's vision when no one stays in the first region and the second region 220. In some examples, the first luminance is preset to be 10%, and the third luminance is preset to be 0%. That is, the luminance control device 6 switches off its illuminating unit when no one stays within the infrared sensor 63's detection range.

In some examples, the processing unit 60 gradually switches to the third luminance.

According to the above descriptions, the illuminating control device 6 is capable of adjusting its luminance for a mobile person or an immobile person with the aid of the infrared sensor 63's detection. The infrared sensor 63's transmitting information, e.g. heat distribution within its detection range, gives better precision than using a camera for motion detection. On top of that, using heat distribution instead of a camera's image better protects any detected human's privacy since such heat distribution cannot reveal much person information than the camera's image can.

Figure 3:
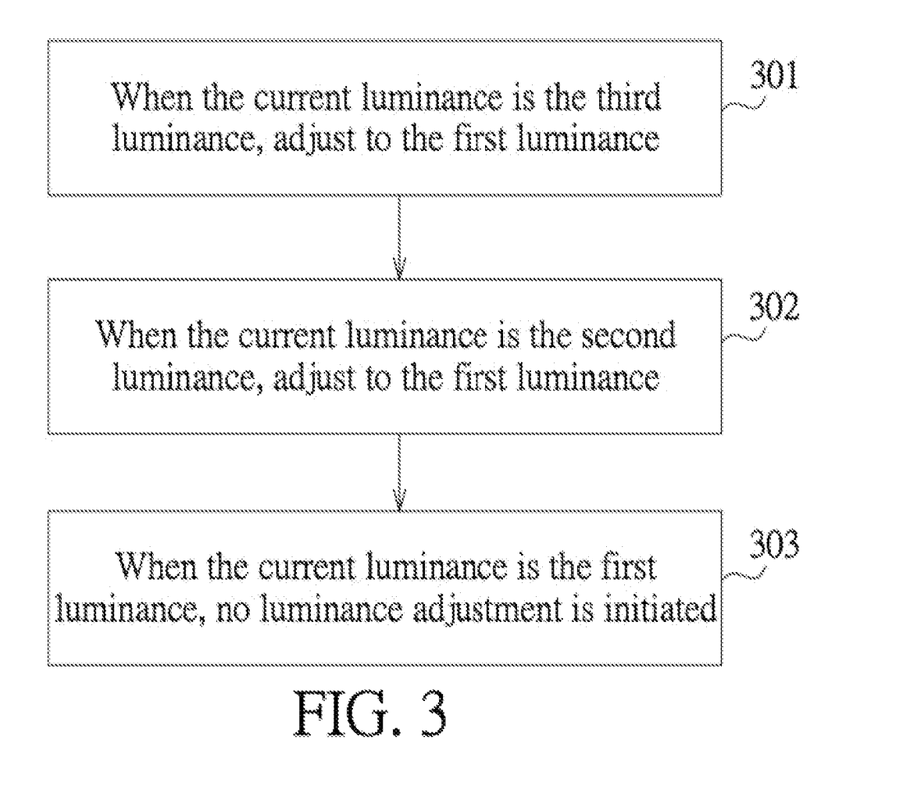
FIG. 3 illustrates a flowchart of implementing how an illuminating device adjusts its luminance based on Step 102 shown in FIG. 1 according to one embodiment.

FIG. 3 illustrates a flowchart of implementing how the illuminating device 6 adjusts its luminance based on Step 102 according to one embodiment.

In Step 301, when the illuminating control device 6 currently utilizes the third luminance, and when the infrared sensor 63 detects human presence within the first region for a first predetermined time interval, the processing unit 60 switches the illuminating control device 6's luminance from the third luminance to the first luminance.

In some examples, when the illuminating control device 6 currently utilizes the third luminance, it indicates that no one stayed within the infrared sensor 63's detection region before. At this time, the processing unit 60 confirms if the infrared sensor 63 detects human presence for at least the first predetermined time interval. If the processing unit 60 confirms the detected human presence occurs for at least the first predetermined time interval, the processing unit 60 switches its utilized luminance from the third luminance to the first luminance. That is, the processing unit 60 switches on its illuminating unit. If the processing unit 60 confirms that the detected human presence hasn't occurred for at least the first predetermined time interval, the processing unit 60 keeps on utilizing the third luminance. In some examples, the first predetermined time interval is equal to zero second. In this way, the processing unit 60 switches its luminance from the third luminance to the first luminance upon detecting human presence. In some examples, the first predetermined time interval is equal to one second. In this way, the processing unit 60 switches its luminance from the third luminance to the first luminance upon detecting human presence within the first region for over one second.

In some examples, the processing unit 60 gradually switches its luminance from the third luminance to the first luminance within a first gradual time interval. For example, if the first gradual time interval is preset to be two seconds, it indicates that the processing unit 60 gradually switches its luminance from the third luminance to the first luminance in two seconds.

In Step 302, when the illuminating control device 6's currently applied luminance is the second luminance, it indicates that at least someone is exiting the second region 220 and entering the first region. Therefore, the processing unit 60 switches the illuminating control device 6's luminance from the second luminance to the first luminance. Such that the someone's luminance experience can be changed according to his/her relative location with respect to the infrared sensor 63's. Moreover, in some examples, the processing unit 60 gradually switches from the second luminance to the first luminance, for example, in one or two seconds. Such that human eyes can better adapt to his/her surrounding luminance changes.

In Step 303, when the illuminating control device 6's currently applied luminance is the first luminance, the processing unit 60 keeps its luminance at the first luminance.

When the illuminating control device 6's currently applied luminance is the first luminance, it indicates that someone has been staying within the first region for a while. Such that the processing unit 60 should keep its applied luminance unchanged.

Figure 4:
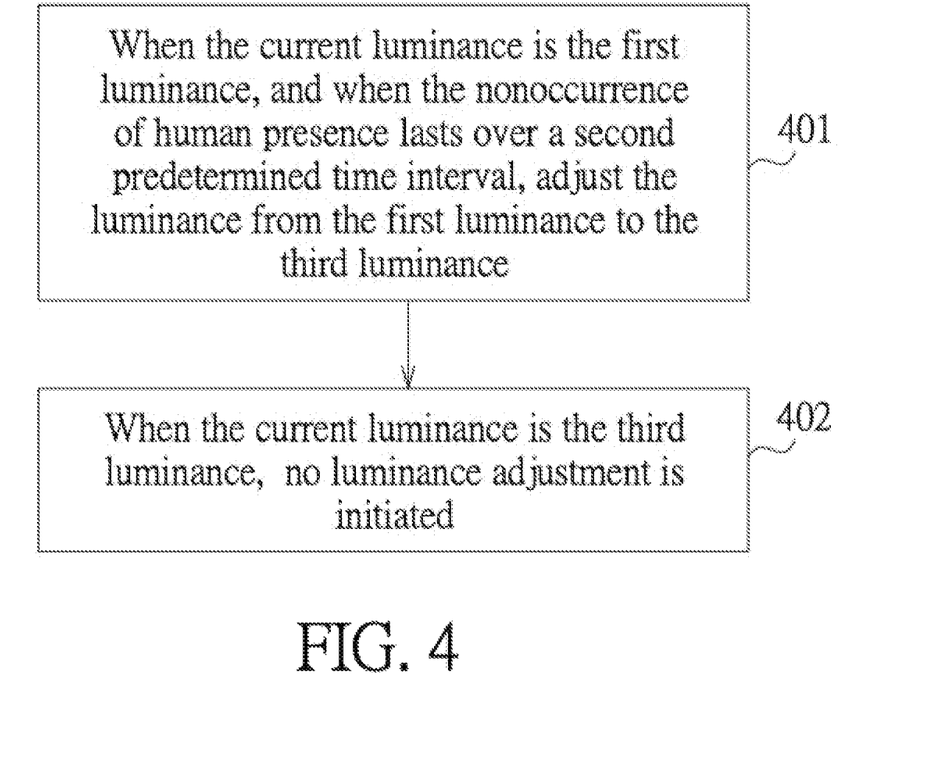
FIG. 4 illustrates how the illuminance control device controls its applied luminance in Step 104 shown in FIG. 1 according to one embodiment.

FIG. 4 illustrates how the illuminating control device 6 controls its applied luminance in Step 104 according to one embodiment.

In Step 401, when the illuminating control device 6's currently applied luminance is the first luminance, and when no one stays within neither the first region nor the second region 220 for a predetermined time interval, the processing unit 60 switches its applied luminance from the first luminance to the third luminance.

If the illuminating control device 6's currently applied luminance is the first luminance, it indicates that someone is staying at the first region. At this time, the illuminating control device 6 examines if no one stays at neither the first region nor the second region 220 for a second predetermined time interval. And when no one stays at neither the first region nor the second region 220 for the second predetermined time interval, the processing unit 60 switches its applied luminance from the first luminance to the third luminance. In other words, the processing unit 60 responds to someone's leaving from the first region to the infrared sensor 63's undetectable external region by switching off its illuminating unit. On the contrary, when the condition that no one stays at neither the first region nor the second region 220 has not last for the second predetermined time interval, the processing unit 60 keeps its applied luminance unchanged, i.e., keeps it at the first luminance.

In some examples, the second predetermined time interval can be dynamically adjusted in response to various requirements, such as one minute. If it is required that when no one stays within neither the first region nor the second region 220 and the illuminating unit is switched off immediately, the processing unit 60 can set the second predetermined time interval to be 0 second.

In some examples, the processing unit 60 gradually switches the applied luminance from the first luminance to the third luminance within a second gradual time interval. Also, the second gradual time interval can be set dynamically in response to various requirements, such as two seconds. The second gradual time interval can be equal to the abovementioned first gradual time interval or not.

In Step 402, when the illuminating control device 6's currently utilized luminance is the third luminance, the processing unit 60 keeps its luminance to be the third luminance.

If the illuminating control device 6's currently applied luminance is the third luminance, it indicates that no one stays at neither the first region nor the second region 220 before. Such that the processing unit 60 should keep its applied luminance unchanged, i.e., the third luminance.

Figure 5:
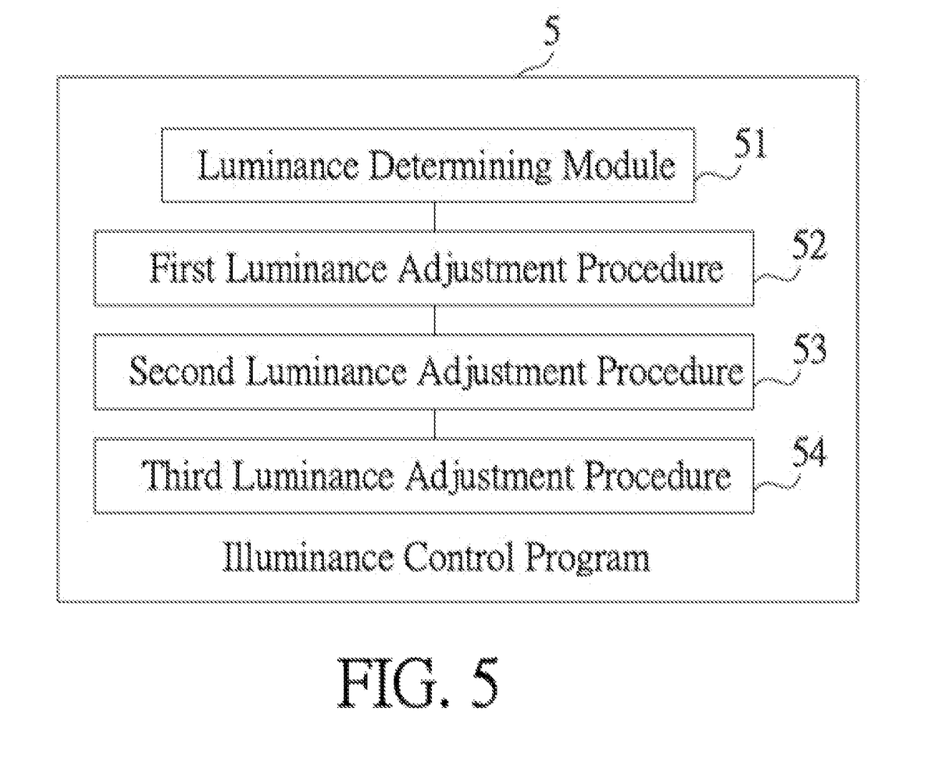
FIG. 5 illustrates an exemplary diagram of an illuminance control program that is stored in the illuminating control device for cooperating with a processing unit to execute the luminance determining method according to one embodiment.

FIG. 5 illustrates an exemplary diagram of the illuminance control program 5 that is stored in the illuminating control device 6 for cooperating with the processing unit 60 to execute the abovementioned steps according to one embodiment. The illuminance control program 5 includes luminance determining module 51, a first luminance adjusting module 52, a second luminance adjusting module 53 and a third luminance adjusting module 54.

The luminance determining module 51 receives information from the infrared sensor 63, such as human presence with the infrared sensor 63's detection range. Such that the processing unit 60 confirms human presence and its related location within the infrared sensor 63's detection range, e.g. in the first region, the second region or an external region.

The first luminance adjusting module 52 adjusts the illuminating control device 6's luminance to the first luminance when human presence is detected in the first region and no human presence is detected in the second region. In some examples, the first luminance adjusting module 52's adjustment is gradual.

In some examples, when the illuminating control device 6's currently utilized luminance is the third luminance, and when the infrared sensor 63 detects human presence within the first region for at least the first predetermined time interval, the first luminance adjusting module 52 switches the illuminating control device 6's luminance to the first luminance.

In some examples, when the illuminating control device 6's currently utilized luminance is the second luminance, the first luminance adjusting module 52 switches the illuminating control device 6's luminance from the second luminance to the first luminance.

In some examples, when the illuminating control device 6's currently utilized luminance is the first luminance, the first luminance adjusting module 52 keeps the illuminating control device 6's luminance at the first luminance.

The second luminance adjusting module 53 adjusts the illuminating control device 6's luminance to the second luminance when human presence is detected in the second region 220. And the second luminance is higher than the first luminance. In some examples, the second luminance adjusting module 53's adjustment is gradual.

The third luminance adjusting module 54 adjusts the illuminating control device 6's luminance to the third luminance when no human presence is detected in the first region and the second region 220. And the third luminance is smaller than the first luminance. In some examples, the third luminance adjusting module 54's adjustment is gradual.

In some examples, when the illuminating control device 6's currently utilized luminance is the first luminance, and when the condition that no human presence is detected with neither the first region nor the second region 220 lasts for at least the second predetermined time interval, the third luminance adjusting module 54 switches the illuminating control device 6's luminance from the first luminance to the third luminance.

In some examples, when the illuminating control device 6's currently utilized luminance is the third luminance, the third luminance adjusting module 54 keeps the illuminating control device 6's luminance at the third luminance.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method of determining luminance according to a location of human presence, comprising:

detecting human presence within an effective detecting region via an infrared sensor; wherein the effective detecting region of the infrared sensor includes a first region and a second region, the first region is farther from the infrared sensor than the second region is, and the first region surrounds the second region;

setting and storing, via a memory, a first luminance for human presence within the first region, a second luminance for human presence within the second region, and a third luminance for nonoccurrence of human presence within both the first region and the second region, wherein the second luminance is higher than the first illuminance, and the first illuminance is higher than the third illuminance; and activating an illuminating device, via a processing unit, by applying the first luminance, the second luminance, or the third luminance, in response to a result of detecting human presence within the effective detecting region of the infrared sensor.

2. The method of claim 1, wherein activating the illuminating device comprises:

activating the illuminating device by applying the first luminance when the infrared sensor detects human presence within the first region.

3. The method of claim 1, wherein activating the illuminating device comprises:

activating the illuminating device by applying the second luminance when the infrared sensor detects human presence within the second region.

4. The method of claim 1, wherein activating the illuminating device comprises:

activating the illuminating device by applying the third luminance when the infrared sensor fails to detect human presence within either the first region or the second region.

5. The method of claim 1, wherein activating the illuminating device comprises:

switching illuminance, via the processing unit, of the illuminating device from an original illuminance to the applied luminance.

6. The method of claim 5, wherein switching the illuminance of the illuminating device comprises:

switching illuminance of the illuminating device from the original illuminance to the first luminance when the infrared sensor detects human presence within the first region.

7. The method of claim 5, wherein switching the illuminance of the illuminating device comprises:

switching illuminance of the illuminating device from the original illuminance to the second luminance when the infrared sensor detects human presence within the second region.

8. The method of claim 5, wherein switching the illuminance of the illuminating device comprises:

switching illuminance of the illuminating device from the original illuminance to the third luminance when the infrared sensor fails to detect human presence within either the first region or the second region.

9. The method of claim 5, wherein switching the illuminance of the illuminating device comprises:

gradually switching illuminance of the illuminating device from the original illuminance to the applied luminance.

* * * * *